United States Patent
Woodlief

(10) Patent No.: US 12,472,702 B2
(45) Date of Patent: Nov. 18, 2025

(54) FIBER REINFORCED PLASTIC COMPONENTS WITH INCREASED SLIP-RESISTANCE AND METHODS OF MANUFACTURE

(71) Applicant: ENDURO COMPOSITES, INC., Houston, TX (US)

(72) Inventor: Wallace S. Woodlief, Houston, TX (US)

(73) Assignee: Enduro Composites, Inc., Houston, TX (US)

( * ) Notice: Subject to any disclaimer, the term of this patent is extended or adjusted under 35 U.S.C. 154(b) by 0 days.

(21) Appl. No.: 17/563,374

(22) Filed: Dec. 28, 2021

(65) Prior Publication Data

US 2022/0203632 A1    Jun. 30, 2022

Related U.S. Application Data

(60) Provisional application No. 63/131,040, filed on Dec. 28, 2020.

(51) Int. Cl.
| | |
|---|---|
| *B29C 33/60* | (2006.01) |
| *B29C 33/62* | (2006.01) |
| *B29C 70/22* | (2006.01) |
| *B29C 70/88* | (2006.01) |
| *B29K 105/08* | (2006.01) |
| *B29K 309/08* | (2006.01) |

(52) U.S. Cl.
CPC ............ *B29C 70/224* (2013.01); *B29C 33/62* (2013.01); *B29C 70/88* (2013.01); *B29K 2105/0845* (2013.01); *B29K 2309/08* (2013.01); *B29K 2827/18* (2013.01); *B29K 2995/0074* (2013.01)

(58) Field of Classification Search
CPC ....... B29C 70/549; B29C 70/42; B29C 33/50; B29C 33/424; B29C 70/52; B29C 70/521; B29C 70/523; B29C 33/68
See application file for complete search history.

(56) References Cited

U.S. PATENT DOCUMENTS

| | | | | |
|---|---|---|---|---|
| 3,016,317 A | * | 1/1962 | Brunner | B32B 27/00 428/167 |
| 3,197,357 A | * | 7/1965 | Schulpen | A47C 27/144 83/17 |
| 3,367,821 A | * | 2/1968 | Keyt | B32B 27/00 156/562 |
| 3,833,440 A | * | 9/1974 | Kashiwa | B29C 51/24 428/188 |
| 4,783,362 A | | 11/1988 | Thornton et al. | |

(Continued)

OTHER PUBLICATIONS

International Search Report and Written opinion dated Mar. 15, 2022 issued in PCT/US2021/65300.

(Continued)

*Primary Examiner* — Matthew J Daniels
(74) *Attorney, Agent, or Firm* — HUNTON ANDREWS KURTH LLP

(57) ABSTRACT

The present application pertains to components such as tank covers with increased slip resistance and processes for making such components. Generally, a patterned release fabric is employed in a manner such that a formed fiber reinforced plastic component has a textured pattern on at least one surface to increase slip resistance.

18 Claims, 1 Drawing Sheet

(56) References Cited

U.S. PATENT DOCUMENTS

| | | | | |
|---|---|---|---|---|
| 5,637,272 | A * | 6/1997 | Yamamoto | B29C 43/10 264/225 |
| 6,303,068 | B1 * | 10/2001 | Kerr | A47G 27/0412 264/293 |
| 6,420,015 | B1 * | 7/2002 | Nord | B29C 44/06 264/293 |
| 6,589,631 | B1 * | 7/2003 | Suzuki | B29C 37/0075 428/187 |
| 6,921,502 | B1 * | 7/2005 | Nord | B29C 44/06 264/257 |
| 10,843,399 | B2 | 11/2020 | Yoo | |
| 2004/0224130 | A1 * | 11/2004 | Melucci | B29C 66/4724 428/156 |
| 2006/0097426 | A1 | 5/2006 | Luepke et al. | |
| 2018/0043666 | A1 * | 2/2018 | Bennett | C08K 3/01 |

OTHER PUBLICATIONS

Fiberglass Cloths, US Composites, Jan. 21, 2020, pp. 3-4, retrieved Mar. 1, 2020.

* cited by examiner

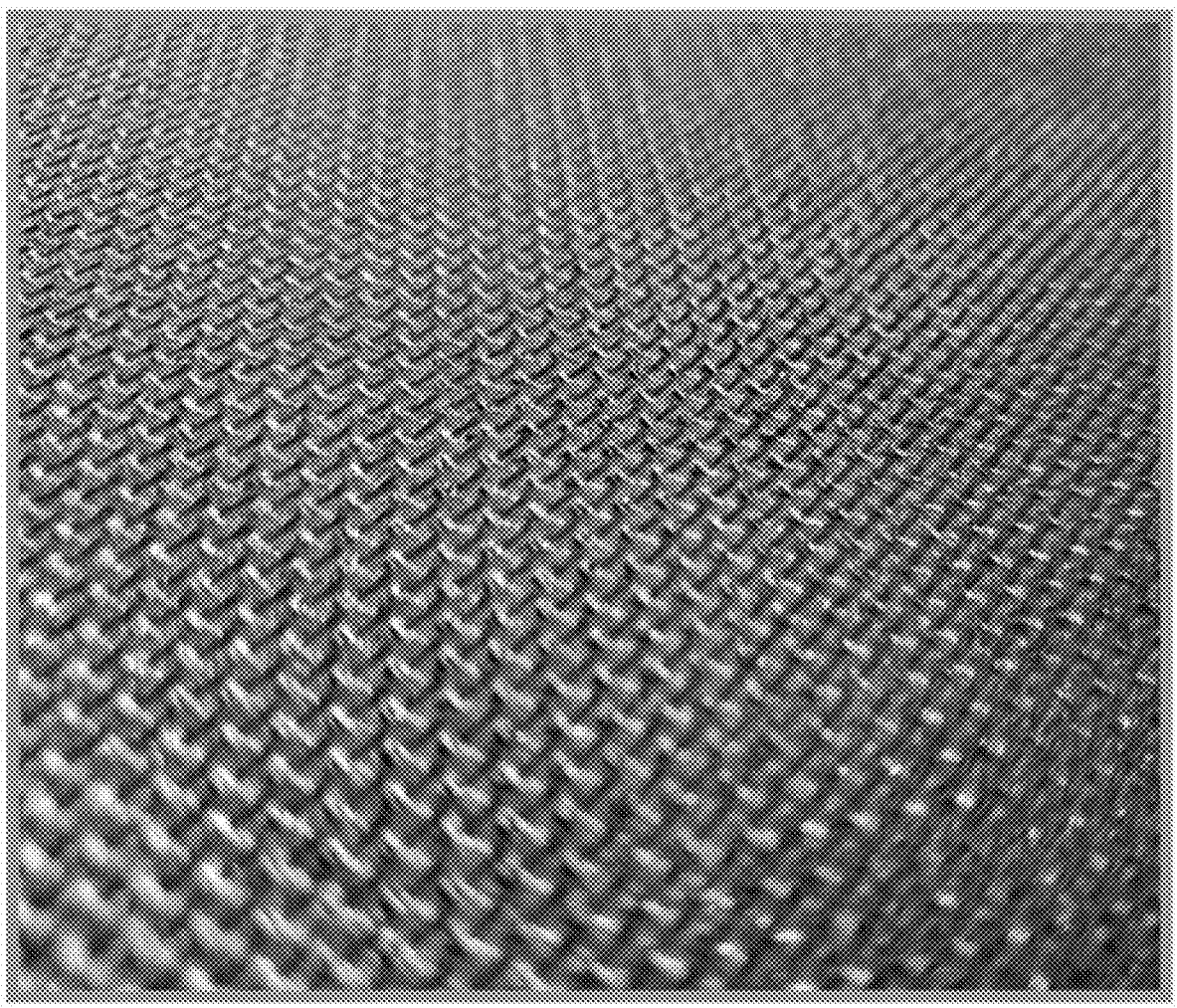

FIBER REINFORCED PLASTIC COMPONENTS WITH INCREASED SLIP-RESISTANCE AND METHODS OF MANUFACTURE

CROSS-REFERENCE TO RELATED APPLICATIONS

This application claims priority to U.S. provisional application Ser. No. 63/131,040 filed Dec. 28, 2020 which application is incorporated by reference herein.

FIELD OF THE INVENTION

This application is related to fiber reinforced plastic components with increased slip resistance for use as, for example, wastewater tank covers and processes for making such components.

BACKGROUND

Current fiber reinforced plastic components such as tank covers often have a surface that tends to be slippery and not particularly conducive to, for example, humans walking on the surface. It would be desirable if components could be made such as tank covers wherein at least one surface had better resistance to slip.

SUMMARY OF THE INVENTION

In general, the application pertains to components with increased slip resistance and processes for making such components. In one specific embodiment, the application pertains to a process for making a component with increased slip resistance. The process generally comprises contacting a patterned release fabric with a resin and a reinforcement material under conditions to form a composite component with the patterned release fabric embedded on a side of the composite component. The patterned release fabric is then removed from the composite component under conditions to form a patterned composite component having increased slip resistance.

Further features of the disclosed design, and the advantages offered thereby, are explained in greater detail hereinafter with reference to specific example embodiments.

BRIEF DESCRIPTION OF THE DRAWINGS

FIG. 1 depicts a representative non-skid surface made using the techniques described herein.

DETAILED DESCRIPTION

In general, the application pertains to components with increased slip resistance and processes to make such components. While virtually any component may be made using the methods described components that are specifically contemplated include tank covers and other components that may be used as a walking surface for humans or animals. Tank covers and other contemplated components are often used in water and waste water treatment such as, for example, those shown in the examples herein. Such tank covers often have strength for long span capability and high load conditions. The tank cover may be custom designed and configured to accommodate most tanks with different shapes, including but not limited to rectangular or round, and different sizes, including but not limited to small or large. Other potential components that may benefit from the non-slip surface and embodiments described herein include, but are not limited to, moving walkways; standing and walking surfaces used in mass transit such as subway floors and train platforms; water towers and cooling towers; roofing and flooring surfaces, etc. Of course, the technology described herein may also have applicability beyond walking or standing surfaces to essentially any resin based product in need of a roughened, textured surface.

The tank covers usually comprise a fiberglass reinforced plastic cover with a high content of reinforcing fibers (up to 60% by weight). The tank cover may comprise one or more panels configured to be removable over an extended period of time without sacrificing structural integrity to the deck and beams even after repeated use. Advantageously, using the processes described herein the panels may comprise non-skid, high-strength structural panels configured, for example, for worker foot traffic. Any number of the panels may also include a gritted surface. In this manner, the high-strength, pultruded, extruded, or other panels may enable the cover to be used as a safe, working surface for operators. The flat, textured surface protects slippage of the operator and/or maintenance personnel as well as, reduces the likelihood of tripping hazards for operators and/or maintenance personnel.

The process employed for making for making a component with increased slip resistance varies depending upon the desired slip resistance, the type of component, and the other desired properties of the component to be made. Generally, the process comprises first contacting a patterned release fabric with a resin and a reinforcement material under conditions to form a composite component with release fabric embedded on a side of the composite component.

Patterned Release Fabric

The patterned release fabric is not particularly limited so long as it may be subsequently removed to provide a textured pattern in the component to provide increased slip resistance. In some embodiments the patterned release fabric may be selected based upon the conditions, e.g., temperature and pressure to which it will subjected. The patterned patterned release fabric may be a woven material with high temperature characteristics such as a glass fabric. Glass and other fabrics that may be subjected to the high temperatures, e.g., higher than about 250, or higher than about 300 F, or higher than about 500 F, employed when using resins such as thermoplastics or thermosets with or without reinforcing material. Useful resins may include, but are not limited to, polyesters, vinylesters, acrylics, modified acrylics, epoxies, urethanes and polyurethanes, polyolefins, and combinations thereof. If desired the glass fabric may be coated with a release agent to facilitate removal from the formed composite leaving the pattern embedded on the component. Such release agents include, for example, polytetrafluoroethylene (PTFE).

The pattern of the release fabric may be selected such that it imparts the desired anti-slip and other properties to the component when it is removed. In some embodiments the patterned release fabric may be an open mesh pattern. The openings may then allow for softened resin (reinforced or not) to flow through at least a portion of the openings such that the fabric is embedded by a desired depth into the softened component. In this manner when the fabric is removed from the component an anti-slip pattern is left on the component. Such open mesh patterns may comprise the same or different shaped openings of the same or different sizes.

For example, the patterned release fabric is an open mesh pattern such as a plain weave comprising polygonal shaped openings selected from triangles, squares, rectangles, pentagons, hexagons, and combinations thereof. In other embodiments the pattern may comprise spherical, elliptical or other shapes or combinations. In some embodiments the size of the longest dimension of each opening may be from about 1 mm to about 5 mm.

The weight of the patterned release fabric may vary depending upon the desired application and properties. In some embodiments the fabric has a weight configured so that the fabric is embedded into a desired thickness of the composite component at a desired applied pressure. In some embodiments the patterned release fabric has a weight of from about 200 g/m$^2$ to about 700 g/m$^2$, or from about 400 g/m$^2$ to about 600 g/m$^2$. Suitable release fabrics may include FF0250W and FF0300W available from Solvay.

Application and Removal of Release Fabric

The specific manner of applying and releasing the patterned fabric to a composite is not particularly critical so long as a patterned composite component having increased slip resistance is formed. Thus, the fabric may be applied while the component is being formed or manufactured. Thus, if the component is being made via a die or molding process then the release fabric may be applied into the mold or die while the resin (with or without reinforcing material such as glass) is sufficiently soft such that resin and any reinforcing materials may flow at least partially through any openings in the fabric. Similarly, if the component is being made via extrusion, pultrusion or some other continuous process then the fabric may be employed at a suitable location during the process such that it is sufficiently embedded while the component is being formed into the final shape or profile. Once cooled, the fabric is removed in a convenient manner forming the final component with a pattern such that desired texture provides anti-slip properties.

In other embodiments a composite component may already be formed and antislip properties are desired to be added. In such cases if the component is a thermoplastic or other material that may be deformable by heat, then a sufficient amount of heat may be applied and the release fabric is then embedded into the component with or without additional pressure. As described above, once sufficiently cooled then the fabric is removed in a convenient manner forming the final component with a pattern such that desired texture provides anti-slip properties.

If desired the component with anti-slip properties may be subjected to further processes such as painting or coating as desired.

EXAMPLES

Water and wastewater tank covers or other surfaces in need of a non-skid surface may advantageously be integrally manufactured with a multi-directional, non-skid fiberglass-reinforced polymer surface technology using the above-described techniques. Such covers or other surfaces are an enhancement to applied non-skid tape in regard to durability and/or savings in field labor. The surfaces may often exceed performance requirements per ANSI A137.1/A326.3 Synamic Coefficient of Friction Test and/or ASHB198:2014 (AS/NZS 4586) Pendulum Test.

The increased slip resistance components are not particularly limited. In representative examples, Enduro products known as AX-3, XL3, XL6, and TUFF SPAN may employ the technology as described in Enduro Composites 2020 or 2021 Water and Wasterwater Products brochures which are incorporated by reference herein. Suitable cover systems to employ the anti-slip technology described herein are also described in U.S. Ser. No. 17/539,957 filed Dec. 1, 2021 which application is incorporated herein by reference.

The description of embodiments provides non-limiting representative examples to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A process for making a component with increased slip resistance comprising:

contacting a patterned release fabric with openings with a resin and a reinforcement material wherein the contacting is conducted while the resin and reinforcement material is sufficiently soft such that the resin and reinforcement material flows at least partially through the openings in the fabric and pultruding under conditions to form a composite component with release fabric embedded on a side of the composite component which is formed into a final shape;

removing the release fabric from the formed composite component under conditions to form a patterned composite component having increased slip resistance.

2. The process of claim 1 wherein the patterned release fabric is a woven material.

3. The process of claim 1 wherein the patterned release fabric is an open mesh pattern comprising the same or different shaped openings of the same or different sizes.

4. The process of claim 1 wherein the patterned release fabric is an open mesh pattern comprising polygonal shaped openings selected from triangles, squares, rectangles, pentagons, hexagons, and combinations thereof.

5. The process of claim 1 wherein the patterned release fabric is an open mesh pattern wherein the size of the longest dimension of each opening is from about 1 mm to about 5 mm.

6. The process of claim 1 wherein the patterned release fabric is a glass fabric mesh.

7. The process of claim 1 wherein the patterned release fabric is coated with a release agent.

8. The process of claim 1 wherein the patterned release fabric is coated with polytetrafluoroethylene.

9. The process of claim 1 wherein the patterned release fabric has a weight configured so that the fabric is embedded into a desired thickness of the composite component.

10. The process of claim 1 wherein the patterned release fabric has a weight of from about 200g/m$^2$ to about 700g/m$^2$.

11. The process of claim 1 wherein the patterned release fabric has a weight of from about 400g/m$^2$ to about 600g/m$^2$.

12. The process of claim 1 wherein the composite component is a tank cover for water or wastewater treatment.

13. The process of claim 12 wherein the tank cover is suitable for a walking surface for a human.

14. The process of claim 12 wherein the tank cover comprises a removable fiberglass reinforced plastic cover.

15. The product of the process of claim 13 wherein the tank cover exceeds performance requirements of ANSI A137.1/A326.3, ASHB 198:2014, or both ANSI A137.1/A326.3 and ASHB 198:2014.

16. The process of claim 1 wherein the release fabric is applied while the composite component is being formed.

17. The process of claim 16 wherein composite component is a tank cover for water or wastewater treatment which is suitable for a walking surface for a human.

18. The process of claim 1 wherein the reinforcement material is glass.

* * * * *